United States Patent [19]

Ferrari

[11] Patent Number: 4,609,868
[45] Date of Patent: Sep. 2, 1986

[54] CIRCUIT FOR DETECTING THE FAILURE OF A STEP MOTOR TO RESPOND TO ENERGIZATION COMMANDS

[75] Inventor: Gianpietro Ferrari, Milan, Italy

[73] Assignee: Honeywell Information Systems Italia, Milan, Italy

[21] Appl. No.: 624,158

[22] Filed: Jun. 25, 1984

[30] Foreign Application Priority Data

Jul. 15, 1983 [IT] Italy ................. 22097 A/83

[51] Int. Cl.$^4$ .......................................... G01R 31/02
[52] U.S. Cl. .......................... 324/158 MG; 361/23; 361/31
[58] Field of Search .............. 324/158 MG; 318/696; 361/23, 31; 310/49 R, 49 A; 322/62, 72, 87

[56] References Cited

U.S. PATENT DOCUMENTS

| | | | |
|---|---|---|---|
| 4,107,593 | 8/1978 | Anderson | 322/62 |
| 4,336,486 | 6/1982 | Marinko | 318/685 |
| 4,358,725 | 11/1982 | Brendemuehl | 318/696 |
| 4,477,758 | 10/1984 | De Biasi | 361/31 |

FOREIGN PATENT DOCUMENTS

0046722 3/1982 European Pat. Off. .
0015191 2/1981 Japan .................... 318/696

Primary Examiner—Reinhard J. Eisenzopf
Assistant Examiner—Vinh Phu Nguyen
Attorney, Agent, or Firm—Nicholas Prasinos; John S. Solakian

[57] ABSTRACT

A circuit for detecting the failure of a step motor to respond to energization commands, which takes advantage of the time constant decrease of an energized phase which occurs due to stalling of the motor. A predetermined current level I in the energized phase is reached in a time interval TI which is shorter than a time interval TO necessary to reach the same current level when there is a response of the motor. The circuit comprises a timer having a predetermined period between TI and TO which activates a bistable circuit indicative of a failure to respond if the current level I is reached in a time shorter than the required time period.

2 Claims, 6 Drawing Figures

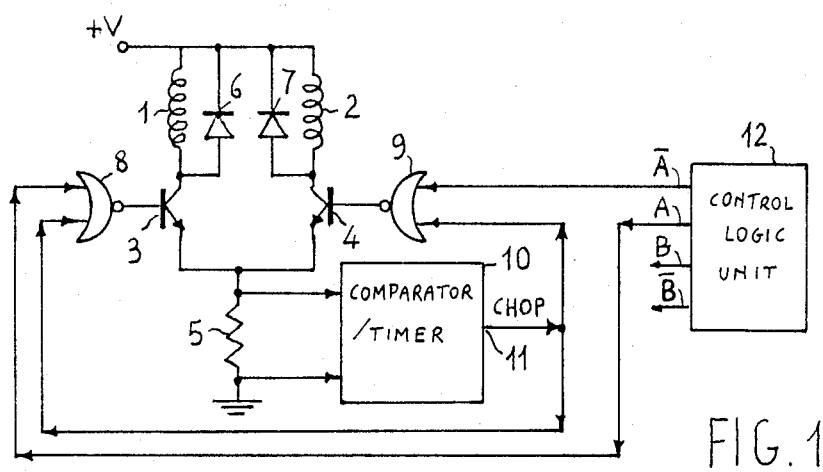
FIG. 1
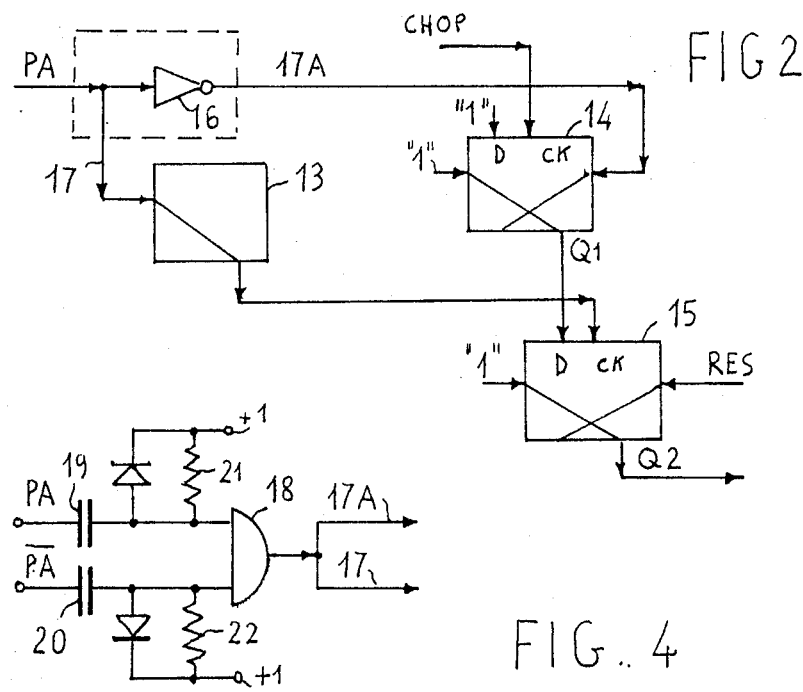
FIG 2
FIG. 4

CIRCUIT FOR DETECTING THE FAILURE OF A STEP MOTOR TO RESPOND TO ENERGIZATION COMMANDS

BACKGROUND

1. Field of the Invention

The present invention relates to a circuit for detecting the failure of a step motor to respond to energization commands.

2. Description of the Prior Art

It is known that step motors are widely used in electromechanical applications where incremental displacements of movable elements are required. They are particularly used in high speed printers. It is also known that these types of motors can be controlled by open loop control systems or closed loop control systems. The closed loop control systems comprise sensing means coupled to the rotor of the motor which means supplies a feedback signal. Among the sensing means, tachometric dynamo and photodisks are typical. The photodisks supply speed and position signals and therefore detect the step motor's responses to the energization commands it receives. Also in the case of a tachometric dynamo, the signal generated by such means enables the detection of a step motor's responses to the energization commands it receives. U.S. Pat. No. 3,896,363 discloses, for example, a feedback circuit which uses a tachometric dynamo for detecting whether or not a step motor responds to the energization commands. However, because of the high costs of closed loop control systems, open loop control systems which do not require sensing means are increasingly used.

It is desirable therefore that these types of control systems are provided with means for detecting the failure of step motors to respond to energization commands. For example, in a serial printer, the step motors are used both for moving the printing carriage along the printing line and for advancing or feeding the printing support. The failure of the motors to respond to energization commands, which may be due to extraneous resisting torques, causes problems in printing and may result in overlapping characters in the same printing position or the printing of several overlapping rows along the same line of the printing support. Generally such problems are detected later by the operator or by the printer itself at preestablished intervals. For example, the serial printers are generally provided with microswitches at the end and beginning of the printing carriage stroke. By counting the energization commands sent to the printing carriage motor, it can be determined whether or not the right number of commands were sent but only at the end of the carriage stroke. Obviously the limitations of such approach are clear. What is desired is to detect any lack of response of a step motor in real time, that is, when the incorrect operation occurs. The scope of the present invention is to overcome such limitations by supplying a circuit for detecting the failure of a step motor to respond to energization commands. Such a circuit can be used in open loop control systems and supplies an error signal in real time.

OBJECTS OF THE INVENTION

The main object of the invention is to provide an improved circuit for detecting the failure of step motor energization in response to commands.

Another object of the invention is to provide a circuit for detecting failure of a step motor in response to energization commands by detecting whether or not there is motion of the armature of the step motor in response to such commands.

SUMMARY OF THE INVENTION

According to the invention the circuit comprises a timer for generating a prefixed and suitably chosen reference time period. Such period is compared with the time interval required by the phase current to reach a preestablished level; and, if it is longer it is indicative of a failure of the motor to operate properly.

These and other features of the invention will become apparent from the following description of a preferred embodiment of the invention and from the enclosed drawings.

BRIEF DESCRIPTION OF THE DRAWINGS

FIG. 1 shows, in schematic form, a step motor control system known in the art.

FIG. 2 shows the electrical diagram of a first preferred embodiment of a circuit for detecting the failure of a step motor to respond according to the invention.

FIG. 4 shows a possible modification of the circuit of FIG. 3.

GENERAL DISCUSSION

Figure 3:
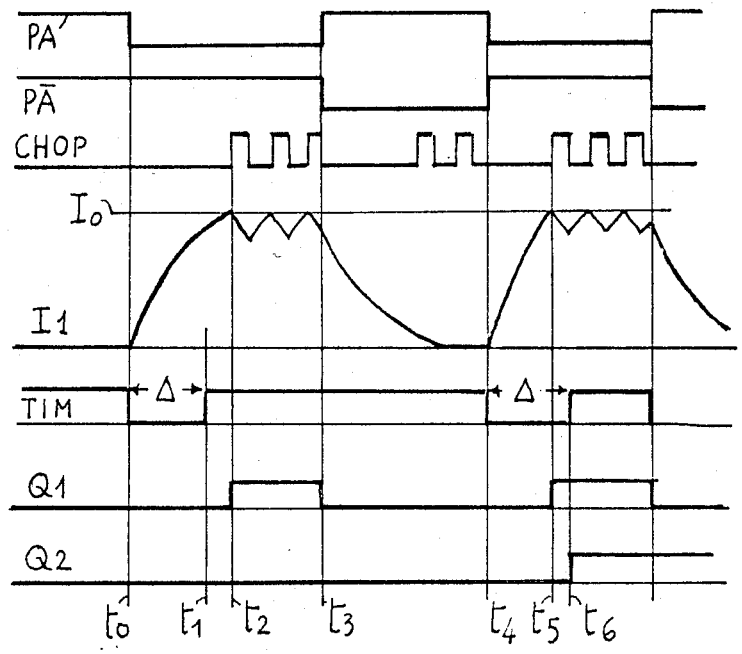
FIG. 3 shows a timing diagram for timing the operation of the circuit of FIG. 2.

Before describing in detail the embodiment of the invention, it is helpful to discuss in a general way, the open loop driving systems for step motors used in the art. FIG. 1 shows, for example, the essential features of such driving systems. In FIG. 1, for sake of simplicity, two phases of a step motor, generally provided with four phases, are indicated with reference numbers 1 and 2. A phase terminal is connected to a constant voltage source +V and the other one is connected to the collector of a transistor 3, 4 respectively. The emitter of transistor 3, 4 is connected to ground through a low value resistor 5. A recycle diode 6, 7 connects the collector of transistor 3, 4 respectively, to voltage source +V. The base of transistor 3, 4 is respectively connected to the output of a NOR gate 8, 9 respectively. The inputs of a comparator/timer 10 are connected to the ends of resistor 5. Such comparator/timer provides a logical "0" signal on output terminal 11 if the voltage drop detected on resistor 5 is lower than a preestablished value $V_1$. When such voltage becomes equal or greater than $V_1$ comparator 10 output rises to 1 and remains at 1 for a preestablished time T. Output 11 of comparator 10 is connected to an input of NOR gates 8, 9. A second input of NOR gates 8, 9 is respectively connected to outputs A, $\overline{A}$ of a control logic unit 12. Such unit generates some phase energization commands, having a preestablished duration and suitable sequence, on its output terminals, A, $\overline{A}$ and on corresponding output terminals B, $\overline{B}$. For example, when A falls to logic level 0 and no current flows within phase 2 (output 11 at 0) transistor 3 is switched on and a current starts to flow within phase 1 and resistor 5. When the current, which increasing according to exponential law, reaches a level I such that $IR=V_1$ (where R is resistor 5) output 11 rises again to 1 and transistor 3 is switched off. The current flowing within phase 1 flows through diode 6 and decreases for a time period T; at the end of such period, transistor 3 is switched on again and the current starts again to increase. When output A rises to logic level 1, the current within phase 1 decreases so as to become zero. At the same time phase 2 can be energized by applying a logic level 0 to output $\overline{A}$.

The circuit disclosed in FIG. 1 exemplifies that one or several changes may be detected provided the following features of the circuit in FIG. 1 are maintained:

(1) A current detector circuit is always present in the energized phases supplying a signal output, when the current reaches a preestablished level. (In the following discussion such a signal will be named CHOP as its function is to interrupt or carry out a CHOPPING of the current flowing within the phases.)

(2) Some current recycle paths are always present which enable the dropping of the current flowing in a phase.

(3) A phase control circuit is always present which generates a suitable phase control command train, hereafter named PA, $\overline{PA}$, PB, $\overline{PB}$.

PREFERRED EMBODIMENTS

Based on these premises, FIG. 2 can now be considered which shows a preferred embodiment of the invention. Referring to FIG. 2 the circuit comprises a NOT gate 16, a univibrator 13 and two D flip-flops 14, 15. It receives from the control system shown in FIG. 1, or from any equivalent system, the phase control signal PA and the signal CHOP interrupting the current flowing in the same phase. Univibrator 13 receives signal PA, through lead 17, on its trigger input and its output is connected to the clock input of flip-flop 15. Additionally signal PA is applied to the reset input of flip-flop 14 through NOT gate 16 and lead 17A. Flip-flop 14 receives signal CHOP at its clock input and its input D is permanently at logic level "1" as well as its preset input. Direct output $Q_1$ of flip-flop 14 is connected to input D of flip-flop 15 whose preset input is permanently at logic level 1. Univibrator 13, when activated by a logic/electrical transistion from 1 to 0 drops its output, normally at level 1 to level 0, for a predetermined time interval. (This type of univibrator is available commercially as integrated circuit with code number 9602. Flip-flops 14 and 15 are also available on the market as integrated circuit with code number 74S74.) The signal present at the flip-flop input D is transferred to direct output when a transition from 0 to 1 is applied to the clock input and the preset and reset input terminals are at "1". By lowering the value of the signal present at preset and reset input terminals to "0" respectively, the flip-flops can be respectively preset and reset.

Referring now to FIG. 3, there is shown a timing diagram of the operation of the circuit shown on FIG. 2. First the circuit is at rest and the step motor rotor is still in a preestablished position. If at instant to phase 1 is energized, signal PA drops to logic level 0 (diagram PA). A current starts to flow in phase 1 (diagram I1). Meanwhile the univibrator is triggered and signal TIM, present on its output, falls to level 0 (diagram TIM).

After a predetermined time interval $\Delta$, that is at instant $t_1$, the univibrator output rises to level 1. Univibrator 13 period is suitably chosen as to be shorter than the time required by the current flowing in phase 1 to reach chopping level $I_O$ (comparator 10 intervention level) when the motor correctly responds to the command; i.e., when the reluctance of the magnetic circuit linked with the energized phase 1 decreases owing to the rotation of the rotor and tends to line up a magnetic pole of a rotor with the magnetic poles of the energized phase. It is obvious that a reluctance decrease of the magnetic circuit linked with phase 1 involves an inductance increase in phase 1 and, therefore an increase of its time constant. Therefore, on average, the time constant of phase 1 is higher when the rotor is in motion because of phase 1 energization than when the rotor is stationary because it cannot rotate due to high frictional torques or otherwise. In case of correct operation, phase 1 therefore reaches the current level $I_o$ at an instant $t_2$ subsequent to $t_1$. At instant $t_1$ signal TIM as an output from univibrator 13 rises to 1 and a rising edge is applied to the clock input of flip-flop 15. If the motor correctly responds to the command, the flip-flop 15 status is not modified; i.e., it stays in reset position because a signal $Q_1=0$ is present at its input D. At instant $t_2$ signal CHOP rises to level 1 (diagram CHOP) and flip-flop 14 is set. This does not affect flip-flop 15 because the clock edge, corresponding to TIM rising to level 1, has been received before at instant $t_1$. At instant $t_3$ phase 1 is de-energized; i.e., signal PA rises to logic level 1. Accordingly flip-flop 14 is reset. An interval $t_3$–$t_4$ follows where phase 1 is still de-energized and a different phase may be energized, for instance, phase 2 (see diagram $\overline{PA}$). It is to be noted that during such an interval flip-flop 14 stays in reset condition though signal CHOP rises to 1. At instant $t_4$ phase 1 is energized again and assuming now that the motor stops; i.e., it fails to respond to the command, owing to frictional torques. In this case current level $I_o$ is reached at an instant $t_5$ in an interval time $t_4$–$T_5$ shorter than period $\Delta$ of univibrator 13. Therefore at instant $t_5$ signal CHOP rises to logic level 1 and flip-flop 14 is set (diagram $Q_1$). At instant $t_6$ subsequent to $t_5$ signal TIM, as an output from univibrator 13, rises to 1 and, correspondingly flip-flop 15 is set (diagram $Q_2$). Output $Q_2$ rises to 1 and generates an error signal which can be sent to the control system to stop the motor energization. Then flip-flop 15 can be reset by a reset command RES sent by the control system. The circuit of FIG. 2 detects the failure of the motor to respond to activation commands of one phase, which is adequate because the incremental operations required by the motor generally involve one or more cyclical energization of all the motor phases.

From this discussion it is clear that the circuit can be modified to detect the failure of the motor to respond to activation commands at any phase in accordance to the energization methods used. For example, a classic energization method of a four phase motor is the one to alternately energize two phases with two mutually exclusive signals such as PA and $\overline{PA}$ of FIG. 3. The other two phases are energized in a mutually exclusive way with a phase angle of 90° and 270° respectively as to phase 1. In this case it is possible to make the circuit of FIG. 2 responsive to command signals both of phase 1 and of phase 2. FIG. 4 shows the required modifications for the circuit of FIG. 2. (The modifications are only the ones within the outlined block.) In this case both signals PA and $\overline{PA}$ are applied to two corresponding inputs of an AND gate 18 through capacitors 19 and 20 respectively. The inputs of AND gate 19 are normally kept at logic level 1 by a pull-up resistor 21, 22 respectively. Each of them temporarily falls to 0 when the corresponding signal PA or $\overline{PA}$ falls to 0. A diode in parallel with the resistors, having its anode connected to the inputs, prevents AND gate 18 inputs from rising to voltage levels higher than the polarization voltage at the positive edges of signals, PA, $\overline{PA}$. AND gate 18 output is connected to leads 17 and 17A and when PA or $\overline{PA}$ falls to 0, it activates univibrator 17 and reset flip-flop 15. In case of mutually exclusive energization of more than two phases, the circuit of FIG. 4, with obvious modifications, can be applied to all the phases energized in a mutually exclusive way. It is apparent that the circuit can be largely "integrated" within the control logic of the motor.

Figure 5:
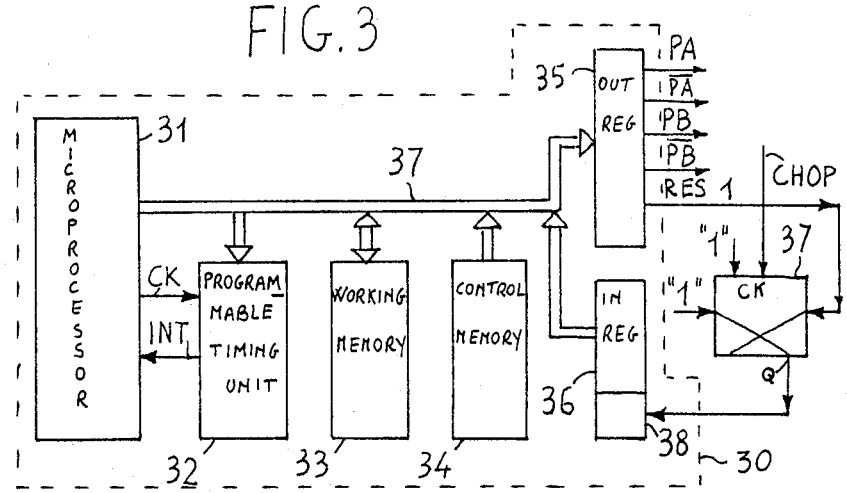
FIG. 5 shows a second preferred embodiment of the detecting circuit according to the invention which is partially integrated in a step motor control system.

Referring now to FIG. 5 there is shown in schematic block form the type of embodiment discussed supra. In FIG. 5 a control logic 30 generates signals PA, $\overline{PA}$, PB, $\overline{PB}$ necessary for motor energization. The control logic comprises a microprocessor 31, a programmable timing unit 32, a working memory 33, a control memory 34, an output register 35 and an input register 36. The control logic elements are connected through a channel or BUS 37 which enables them to communicate. Programmable timing unit 32 consists of a counter which may be preset or loaded with a preestablished value through BUS 37. Counter 32 counts down owing to fixed frequency clock pulses CK received from microprocessor 31. When counter 32 reaches the preestablished value 0, it sends an interrupt signal INT to microprocessor 31. Upon receiving such a signal microprocessor 31 activates an interrupt handling microprogram.

A well known program to use with the disclosed control logic to control a step motor is one which executes a microprogram which loads, at a predetermined instant, the programmable timing unit with a predetermined number and further loads the output register 35 with a suitable code either before or after loading the programmable timing unit. The code may be indicative of the motor phases which must be energized. In other words, some outputs of register 35 generate the phase energization control signals PA, $\overline{PA}$, PB, $\overline{PB}$. The information required to establish the binary code is obviously obtained from the executed microprogram. The duration of signals PA, $\overline{PA}$, PB, $\overline{PB}$ is established by timing unit 32. When the timing unit emits the interrupt signal INT, microprocessor 31 activates again the control microprogram of the motor, loading output register 35 with a new code and loading again timing unit 32 with a suitable reckoning value. With this type of system; that is, by loading unit 32 with suitable and variable values, phase energization commands can be generated of variable length and in a suitable sequence; it is therefore possible to control the acceleration, deceleration speed and direction of rotation of the motor. With the addition of few elements, control logic 30 is able to detect the failure of the motor to respond to such phase commands. More particularly one flip-flop 37 external to logic 30 will suffice. Such a flip-flop carries out the same function performed by flip-flop 14 of FIG. 2. The function carried out by univibrator 13 and by flip-flop 15 of FIG. 2 is, in this case, performed by timing unit 32 and by a cell 38 of the input register 36 respectively. The duration D of energization command is obtained as the sum of two time intervals $\Delta$ and $D-\Delta$ respectively generated by unit 32. This allows timing unit 32 to jointly establish the energization command duration and the instant delay, as to the beginning of a phase energization command, when it is to be verified whether or not the phase current has reached a preestablished value.

Figure 6:
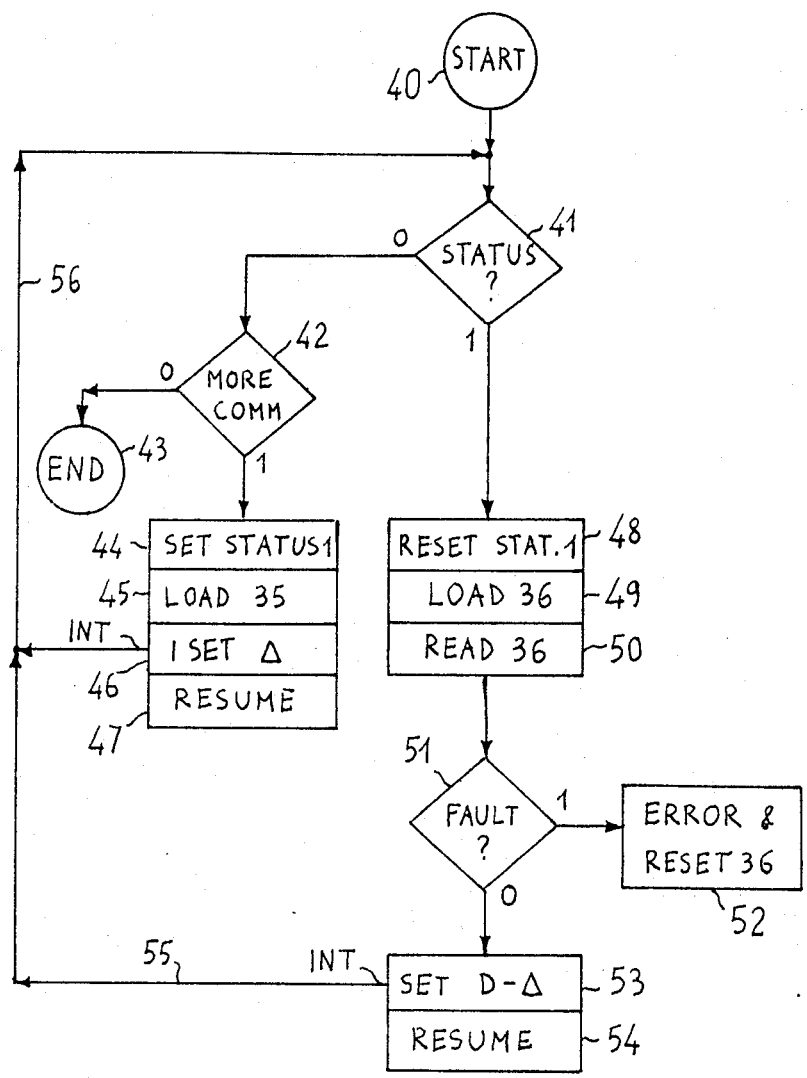
FIG. 6 shows the operative logical flow of the circuit and the system of FIG. 5.

Referring now to FIG. 6 there is shown a logic flow diagram that charts the operation of the control logic of FIG. 5. Microprocessor 31 activates a motor control microprogram (block 40) in order to control the motor. First it verifies a status register content where an information is loaded indicating whether timing unit 32 is measuring time interval $\Delta$ (STATUS 1) or time interval $D-\Delta$ (STATUS 0). Such an operation is shown by block 41. It is clear that, at the beginning of the process, the information is 0. Whether phase commands are to be generated or not (block 42 "MORE COMM") is then verified. This check is essential to stop the motor control process when there is no movement of the motor armature. If no phase commands are to be generated, the motor control process stops and recalls other processes (block 43). Otherwise a status register is loaded with the information STATUS 1 (block 44), register 35 is loaded with a code indicative of which phase (or phases) must be energized, the code further supplies flip-flop 37 with a reset command RES 1 (block 45); unit 32 is loaded (SET $\Delta$) with a code indicative of time interval $\Delta$ and the unit itself is activated (block 46). At this point the process is suspended and the system can go on to execute the control processes (block 47 RESUME). When the time interval $\Delta$ elapses, unit 32 generates an interrupt signal INT which enables microprocessor 31 to execute again the interrupted process, starting from block 41 (flow line 56). The status of the system is verified and, since this is 1, (STATUS=1) the status is modified (block 48 RESET STAT 1). The loading of register 36 with the information present at its inputs is then carried out (block 49—LOAD 36). The input of cell 38 of register 36 is coupled (FIG. 5) to the output Q of flip-flop 37. Flip-flop 37 is set by signal CHOP. Therefore if signal CHOP rises to 1 before register 36 is loaded, cell 38 is loaded with an information at level 1, rather than information at level 0. If cell 38 is loaded with a logic "1", this means that the motor did not respond to the command sent and a failure is present. After register 36 is loaded, microprocessor 31 reads out the content of such register (block 50) and verifies if an error indication exists (block 51). If the fault indication is present, the process indicates such fault and register 36 is reset (block 52). The failure indication can further activate some suitable processes. If no fault indication is present the process continued and loads unit 32 with a code indicative of the time interval $D-\Delta$ and unit 32 is activated (block 53). The process is then suspended and the system can recall other control processes (block 54). When the time interval $D-\Delta$ has elapsed unit 32 generates a new interrupt signal INT which allows microprocessor 31 to execute again the process already described starting from block 41 (flow line 55 and 56). It is obvious that the codes loaded each time into unit 32 are preferably indicative of the time intervals $\Delta$ and $D-\Delta$ corrected so as to take into account the execution time of the several phases of the control process. It is further apparent that the time interval $\Delta$ can constitute, in this case, a parameter variable according to the operative condition of motor, instead of a fixed value, to allow for an increase in the invention's detecting sensitivity by adapting the time discrimination to different requirements.

It may be useful to mention how an immediate fault indication can be used. The easiest method is the one to stop the motor energization to avoid possible persistent overloading, as well as to stop possible operations involving the rotor movement. So, in the case of motors used in serial printers which control the printing carriage movement, printing operations can be stopped thus avoiding the overlapping of several characters in the same printing position. "Retry" processes can be also started. In other words, the rotation of the rotor in the opposite direction can be ordered, if the opposite rotation succeeds, the rotor can be brought to a known position. At this point the rotation of the rotor can be commanded in the previous direction. If the motor correctly responds to the commands and extraneous torques are not present, the printing can be started again from the point where the interrupt occurred. If a retry process performed one or more times, has a negative result, the stopping of the printer can be commanded and the fault can be pointed out to the operator who will provide for its correction.

What is claimed is:

1. A circuit for detecting the failure of a step motor to respond to energization commands, the motor having phases each energizeable by a current in response to an energization command, the motor being controlled by a control system comprising means for selectively generating phase energization command, means for detecting the energization current flowing within the energized phases and for supplying a current signal when such current reaches a prefixed value, characterized in that the circuit comprises:

timing means activated at the beginning of the energization commands of a first phase at least, for periodically generating a timing signal with a preestablished delay as to said beginning of each of the energization commands of said first phase, first bistable means set by said current signal and reset by a command (phase energization command included) emitted by said control system, for providing, when set, an output signal indicating that the energization current has reached said prefixed value, and detecting means receiving said output signal for detecting if said output signal is provided before the generation of said timing signal.

2. A circuit as per claim 1 wherein said detecting means consist of a second bistable means triggered by said timing signal and set in a first status if said output signal is asserted before the occurrence of said timing signal, said second bistable means, when set in said first status, asserting in output an error signal indicating that the motor has failed to move in response to an energization command.

* * * * *